United States Patent
Usami et al.

(10) Patent No.: US 7,187,390 B2
(45) Date of Patent: Mar. 6, 2007

(54) METHOD AND PROGRAM FOR DETERMINING INTERSECTION POINT OF TRIANGLE WITH LINE SEGMENT

(75) Inventors: Shugo Usami, Wako (JP); Kiwamu Kase, Wako (JP)

(73) Assignee: Riken, Saitama (JP)

( * ) Notice: Subject to any disclaimer, the term of this patent is extended or adjusted under 35 U.S.C. 154(b) by 31 days.

(21) Appl. No.: 10/537,160

(22) PCT Filed: Dec. 5, 2003

(86) PCT No.: PCT/JP03/15586

§ 371 (c)(1),
(2), (4) Date: May 31, 2005

(87) PCT Pub. No.: WO2004/053741

PCT Pub. Date: Jun. 24, 2004

(65) Prior Publication Data

US 2005/0283513 A1 Dec. 22, 2005

(30) Foreign Application Priority Data

Dec. 6, 2002 (JP) .............................. 2002-354594

(51) Int. Cl.
*G09G 5/00* (2006.01)

(52) U.S. Cl. .................... 345/620; 345/619; 345/648

(58) Field of Classification Search .................. None
See application file for complete search history.

(56) References Cited

U.S. PATENT DOCUMENTS

| | | | | |
|---|---|---|---|---|
| 4,953,094 A | * | 8/1990 | Letcher, Jr. ................. | 700/182 |
| 5,351,310 A | * | 9/1994 | Califano et al. ............ | 382/199 |
| 6,300,958 B1 | * | 10/2001 | Mallet ........................ | 345/442 |
| 6,633,789 B1 | * | 10/2003 | Nikolskiy et al. ............ | 700/98 |
| 6,862,023 B1 | * | 3/2005 | Shaikh ........................ | 345/420 |
| 2002/0093520 A1 | * | 7/2002 | Larson ........................ | 345/694 |
| 2002/0126117 A1 | * | 9/2002 | Grzeszczuk et al. ......... | 345/420 |
| 2002/0190988 A1 | * | 12/2002 | Maillot et al. .............. | 345/428 |
| 2003/0139834 A1 | * | 7/2003 | Nikolskiy et al. ............ | 700/98 |
| 2004/0090437 A1 | * | 5/2004 | Uesaki et al. ................ | 345/420 |
| 2004/0096799 A1 | * | 5/2004 | Hughes et al. ............... | 433/24 |

FOREIGN PATENT DOCUMENTS

JP        2002-230054        8/2002

OTHER PUBLICATIONS

Author: Tomas Moller, Title: Fast, Minimum Storage Ray-Triangle Intersection, Date: 1997, Journal of Graphic Tools, pp. 2-3.*

(Continued)

*Primary Examiner*—Mark Zimmerman
*Assistant Examiner*—David Chu
(74) *Attorney, Agent, or Firm*—Griffin & Szipl, P.C.

(57) ABSTRACT

A coordinate system R is set in which $P_0$ is a coordinate origin, $P_0P_1$ conforms to a first U axis to have a unit length, $P_0P_2$ conforms to a second V axis to have a unit length, and $P_0P_1 \times P_0P_2$ is a unit vector conforming to a third N axis. A transforming matrix M that transforms an ordinary coordinate system into the coordinate system R and the u-, v- and n-coordinate values of the both ends of the line segment are calculated. It is determined whether or not the line segment intersects with the triangle, on the basis of the u-, v- and n-coordinate values. The u-, and v-coordinate values of the intersection point are calculated. It is determined whether or not the intersection point is positioned inside the triangle, on the basis of the u-, and v-coordinate values of the intersection point.

8 Claims, 12 Drawing Sheets

OTHER PUBLICATIONS

"Intersections of Rays and Segments with Triangles in 3D" by Dan Sunday, online publication dated May 2001.

International Search Report in corresponding application PCT/JP03/05586 completed Jan. 6, 2004 and mailed Jan. 20, 2004.

Möller et al., "Fast, Minimum Storage Ray-Triangle Intersection", Journal of graphics tools, pp. 1-7, 1997.

Badouel, "An Efficient Ray-Polygon Intersection", Graphics Gems, pp. 390-393.

O'Rourke, "Point in Polygon", Computational Geometry in C, pp. 239-245.

* cited by examiner

CELL CUT POINTS
PRODUCED BY
CALCULATING
INTERSECTION POINT
OF INPUT DATA
WITH CELL RIDGE

US 7,187,390 B2

METHOD AND PROGRAM FOR DETERMING INTERSECTION POINT OF TRIANGLE WITH LINE SEGMENT

This is a National Phase Application in the United States of International Patent Application No. PCT/JP2003/015586 filed Dec. 5, 2003,which claims priority on Japanese Patent Application No. 354594/2002, filed Dec. 6, 2002. The entire disclosures of the above patent applications are hereby incorporated by reference.

BACKGROUND OF THE INVENTION

1. Field of the Invention

The present invention relates to a method and a program for determining an intersection point of a triangle with a line segment.

2. Description of the Related Art

Substantial data that includes shape data and physical property data integrated with each other can be stored with a small memory capacity. Thereby, data regarding a shape, a structure, a physical property and a history of an object can be managed in an integrated fashion, and data regarding a series of processes such as designing, machining, assembling, testing, and evaluating can be managed by the same data. Patent Literature 1 discloses a substantial data storing method by which a CAD and a simulation can be integrated.

[Patent Literature 1] Japanese Laid-Open Patent Publication No. 2002-230054.

According to Patent Literature 1, as shown in FIG. 1, the method of storing substantial data configured from shape data and physical property data integrated with each other includes an external data input step (A), oct-tree division step (B), and a cell data storing step (C). In the external data input step (A), the external data 12 including the boundary data of the object is input to a computer or the like having a stored program for the method of the Patent Literature 1. This boundary data is obtained in an external data obtaining step S1. In the oct-tree division step (B), oct-tree division divides the external data 12 into rectangular parallelepiped cell of which boundary surfaces are perpendicular to each other. In the cell data storing step (C), various physical property values are stored for each cell.

According to the storing method of Patent Literature 1, the external data including the shape data of the object is divided into rectangular parallelepiped cells of which boundary surfaces are perpendicular to each other, and the various physical property values are stored for each cell. Each divided cell is classified into an internal cell or a boundary cell that includes the boundary surface. The internal cell contains one kind of physical property values as attribute, and the boundary cell contains two kinds of physical property values corresponding to the inside and the outside of the object, respectively.

Hereinbelow, the data used in the above method is referred to as "V-CAD data", and designing and simulation using this data is referred to as "volume-CAD" or "V-CAD". In FIG. 1, the reference numeral 14 designates V-CAD data.

FIG. 2 shows a flow of creating V-CAD data from external data according to the method of Patent Literature 1. As shown in FIG. 2, in STEP-1, a voxel space is defined for S-CAD data or a triangle patch data, and in STEP-2, intersection points of a geometric shape with the ridges of each cell are determined by calculation (that is, cell cut points are determined). In STEP-3, an outer circumferential loop of the cell internal surface is formed on the basis of the cut point data for each cell. In STEP-4, the inside of the outer circumferential loop are divided into triangles by referring to the original geometric shape. In STEP-5, the medium values of the cell are set. Thereby, the V-CAD data is formed.

In the method of Patent Literature 1, the intersection points of the triangle with the ridges of each cell need be repeatedly calculated a number of times. This triangle defines a geometric shape expressed by the external data.

Non-Patent Literatures 1 through 3 disclose conventionally known methods of calculating the intersection point of the triangle with the line segment.

[Non-Patent Literature 1]

Möller's method (Journal of graphics tools, 2(1): P21–28 1997).

[Non-Patent Literature 2]

Badouel's method (Graphic Gems, Academic Press P390–393 1990.

[Non-Patent Literature 3]

Computational Geometry in C: Joseph. O'Rourke/Cambridge University Press P239).

Various methods are used for calculating the intersection point of a triangle with a line segment. Many of these methods calculate the intersection of an infinite plane with an infinite line to determine whether or not the intersection point is positioned inside the triangle of the closed region on the plane. The calculation by these methods results in a high cost, and in the future in the field of the V-CAD system, it will be necessary to improve the calculation method in which calculation is repeatedly performed a number of times.

According to the Moller's method of Non-Patent Literature 1, a calculation cost can become relatively low by use of the vector calculation expressed by the following Equation (1) of Formula 2.

[Formula 2]

$$\begin{bmatrix} t \\ u \\ v \end{bmatrix} = \begin{bmatrix} (\overrightarrow{P_1P_{Lin}} \times \overrightarrow{P_1P_2}) \cdot \overrightarrow{P_1P_3} \\ (V_{Dir} \times \overrightarrow{P_1P_3}) \cdot \overrightarrow{P_1P_{Lin}} \\ (\overrightarrow{P_1P_{Lin}} \times \overrightarrow{P_1P_2}) \cdot \overrightarrow{P_1P_{Lin}} \end{bmatrix} \Big/ ((V_{Dir} \times \overrightarrow{P_1P_3}) \cdot \overrightarrow{P_1P_2}) \quad (1)$$

$P_1, P_2, P_3, P_{Lin}$: the triangle vertexes, the starting point of the line segment $V_{Dir}$: a direction vector of the line segment t: a parameter in the line segment u and v: parameters in the triangle However, in this method, even when calculating intersection points of plural different line segments with the same triangle, it is necessary to work out the equation repeatedly for each line segment. Accordingly, this method produces no merit for the intersection calculation on the same triangle, and cannot improve a calculation speed.

According to the Badouel's method of Non-Patent Literature 2, an intersection point is calculated by using a standard point $P_{Pln}$ of a plane, a normal vector $V_{Nrm}$, and a standard point $P_{Lin}$ of a line.

The distance between the standard point of the line and the plane is calculated by $dst = V_{Nrm} \cdot V_{Pnt}$ ($V_{Nrm}$ is a unit vector), so that the coordinates of the intersection point are calculated by $P_{Int} = P_{Lin} + V_{Lin} \cdot dst/(V_{Lin} \cdot V_{Nrm})$.

Subsequently, the respective triangle vertexes and the intersection point of the plane with the line are projected on any of coordinate planes (xy plane, yz plane and zx plane), and α and β in the equation (3) of Formula 3 are calculated on this projection plane.

In the case of the xy projection plane in FIG. 4, α and β are calculated by the inverse transformation of the linear transformation of the equation (4) of Formula 3 with $P_1(x_1, y_1, z_1)$, $P_2(x_2, y_2, z_2)$ and $P_3(x_3, y_3, z_3)$ and $P_{Int}(x, y, z)$, and with the z coordinates of each vertex being omitted.

[Formula 3]

$$V_{Pnt} = \overrightarrow{P_{Pin}P_{Lin}} \quad (2)$$

$$\overrightarrow{P'_1 P'_{Int}} = \alpha \overrightarrow{P'_1 P'_2} + \beta \overrightarrow{P'_1 P'_3} \quad (3)$$

$$\begin{pmatrix} x \\ y \end{pmatrix} = \begin{bmatrix} x_2 - x_1 & x_3 - x_1 \\ y_2 - y_1 & y_3 - y_1 \end{bmatrix} \begin{pmatrix} \alpha \\ \beta \end{pmatrix} \quad (4)$$

There is following another inside/outside determination method of determining whether or not the intersection point is inside the triangle while this inside/outside determination method determines the intersection point of an infinite plane with a line by the same calculation as that of the Badouel's method.

According to an angle calculation method of Non-Patent Literature 3, in FIGS. 5A and 5B, inner product is calculated for each two of vectors extending from the intersection point to the respective vertexes. Then, it is determined whether or not the intersection point is inside the triangle on the basis of the calculated angle sum of 0 or 360 degrees. That is, in the case of FIG. 5A, the equation (5) can be established, and in the case of FIG. 5B, the equation (6) can be established.

$$\theta_{12} + \theta_{23} + \theta_{31} = 2PI \quad (5)$$

$$\theta_{12} + \theta_{23} + \theta_{31} = 0 \quad (6)$$

Alternatively, as shown in FIGS. 6A and 6B, outer product is calculated for each two of the vectors from the intersection point to the respective vertexes by the equation (7) of Formula 4.

[Formula 4]

$$V_{Nrm12} = V_1 \times V_2$$

$$V_{Nrm23} = V_2 \times V_3 \quad (7)$$

$$V_{Nrm31} = V_3 \times V_1$$

In the case of FIG. 6A, $V_{Nrm12}$, $V_{Nrm23}$ and $V_{Nrm31}$ extend in the same direction, and in the case of FIG. 6B, VNrm31 extends in the opposite direction to $V_{Nrm12}$ and $V_{Nrm23}$.

However, calculation of the outer product will apparently increase calculation load.

As described above, according to the conventional method of calculating the intersection point of a triangle with a line segment, when calculating the intersection point of the same triangle with plural different line segments, the calculation need be performed again and again for each intersection point. As a result, entire calculation time becomes long, and it becomes difficult to realize high speed calculation.

SUMMARY OF THE INVENTION

The present invention was made to solve the above problems. That is, it is an object of the present invention to provide intersection point calculation method and program that can reduce the calculation time and achieve high speed calculation at the time of calculating intersection points of the same triangle with plural different line segments.

According to the present invention, there is provided a method for calculating an intersection point of a triangle with a line segment, the triangle having three vertexes $P_0$, $P_1$, $P_2$, and the line segment having both ends A and B, comprising:

a coordinate system setting step (A) of setting a coordinate system R in which $P_0$ is a coordinate origin, $P_0P_1$ conforms to a first axis (U axis) to have a unit length, $P_0P_2$ conforms to a second axis (V axis) to have a unit length, and $P_0P_1 \times P_0P_2$ is a unit vector conforming to a third axis (N axis), a transforming matrix calculation step (B) of calculating a transforming matrix M that transforms coordinate values in an ordinary coordinate system into coordinate values in the coordinate system R;

a line segment end coordinate calculation step (C) of calculating u-, v- and n-coordinate values of the both ends A and B of the line segment;

an intersection determination step (D) of determining whether or not the line segment intersects with the triangle, on the basis of the u-, v- and n-coordinate values of the both ends A and B;

an intersection point coordinate calculation step (E) of calculating u-, and v-coordinate values of the intersection point when the line segment intersects with the triangle; and an intersection point determination step (F) of determining whether or not the intersection point is positioned inside the triangle, on the basis of the u-, and v-coordinate values of the intersection point.

Further, according to the present invention, there is provided a program causing a computer to calculate an intersection point of a triangle with a line segment, the triangle having three vertexes $P_0$, $P_1$, $P_2$, and the line segment having both ends A and B, the program causing a computer to perform:

a coordinate system setting step (A) of setting a coordinate system R in which $P_0$ is a coordinate origin, $P_0P_1$ conforms to a first axis (U axis) to have a unit length, P0P2 conforms to a second axis (V axis) to have a unit length, and P0P1×P0P2 is a unit vector conforming to a third axis (N axis), a transforming matrix calculation step (B) of calculating a transforming matrix M that transforms coordinate values in an ordinary coordinate system into coordinate values in the coordinate system R;

a line segment end coordinate calculation step (C) of calculating u-, v- and n-coordinate values of the both ends A and B of the line segment;

an intersection determination step (D) of determining whether or not the line segment intersects with the triangle, on the basis of the u-, v- and n-coordinate values of the both ends A and B;

an intersection point coordinate calculation step (E) of calculating u-, and v-coordinate values of the intersection point when the line segment intersects with the triangle; and an intersection point determination step (F) of determining whether or not the intersection point is positioned inside the triangle, on the basis of the u-, and v-coordinate values of the intersection point.

With the above method or program, it is possible to calculate the u-, v- and n-coordinate values of the both ends A and B of the line segment by only performing the line segment end coordinate calculation step (C) on the plural different line segments because the transforming matrix corresponding to the same triangle is always same when intersection points of the same triangle with the plural different line segments are calculated. Accordingly, the present invention can reduce the number of calculations compared to the conventional method so that the calculation time can be reduced, and high speed calculation can be achieved.

According to a preferred embodiment of the present invention, the transforming matrix M calculated in the transforming matrix calculation step (B) is an affine transforming matrix.

The affine transforming matrix corresponding to the triangle can easily be calculated in a short time.

Furthermore, preferably, in the line segment end coordinate calculation step (C), the u-, v- and n-coordinate values are calculated by the equation (8):

$$P_{UVN} = MP_{xyz} \quad (8).$$

By using the equation (8), it is possible to easily calculate the u-, v- and n-coordinate values of the both ends A and B of the plural different line segments in a short time.

Preferably, the intersection determination step (D) including:

(1) determining that the intersection point does not exist when one of the both ends has the absolute n-coordinate value not smaller than a length of the line segment, and/or (2) determining that the intersection point exists when the n-coordinate values of the both ends have different signs. Thereby, it is possible to easily determine whether or not the intersection point exists, in a short time.

Preferably, the intersection determining step (D) includes determining that the intersection point is positioned outside the triangle (1) when each of the both ends has the u-coordinate value not larger than "0" or not smaller than "1", (2) when each of the both ends has v-coordinate value not larger than "0", or (3) when each of the both ends has the u- and v-coordinate values of which sum is not smaller than "1".

Thereby, it is possible to easily determine whether the intersection point is inside or outside the triangle, in a short time. Further, it is possible to exclude the line segment that does not apparently have the intersection point inside the triangle, omitting superfluous calculations.

Preferably, the intersection point coordinate calculating step (E) includes internally dividing the line segment by the n-coordinate values of the both ends A and B, determining the internally divided point as the intersection point, and calculating u- and v-coordinate values of the intersection point.

Thereby, it is possible to easily calculate the u- and v-coordinate values of the intersection point in a short time.

Furthermore, preferably, the intersection point determination step (F) includes determining that the intersection point is inside the triangle when the u- and v-coordinate values of the intersection point satisfy three inequalities (13) of Formula 1:

[Formula 1]

$$0 \leq u \leq 1 \text{(range in a } V_{ec1} \text{ direction)}$$

$$0 \leq v \leq 1 \text{(range in a } V_{ec2} \text{ direction)} \quad (13)$$

$$0 \leq u+v \leq 1 \text{(inside a line } P_1P_2)$$

Thereby, it is possible to easily determine whether or not the intersection point is inside or outside the triangle, in a short time. Further, before the intersection point is actually calculated, the line segment that does not have the intersection point inside the triangle can be excluded, omitting superfluous calculations.

Other object and advantageous features of the present invention will become apparent in the following description with reference to the attached drawings.

DESCRIPTION OF THE PREFERRED EMBODIMENTS

In the following, a preferred embodiment of the present invention will be described with reference to the drawings.

Figure 1:
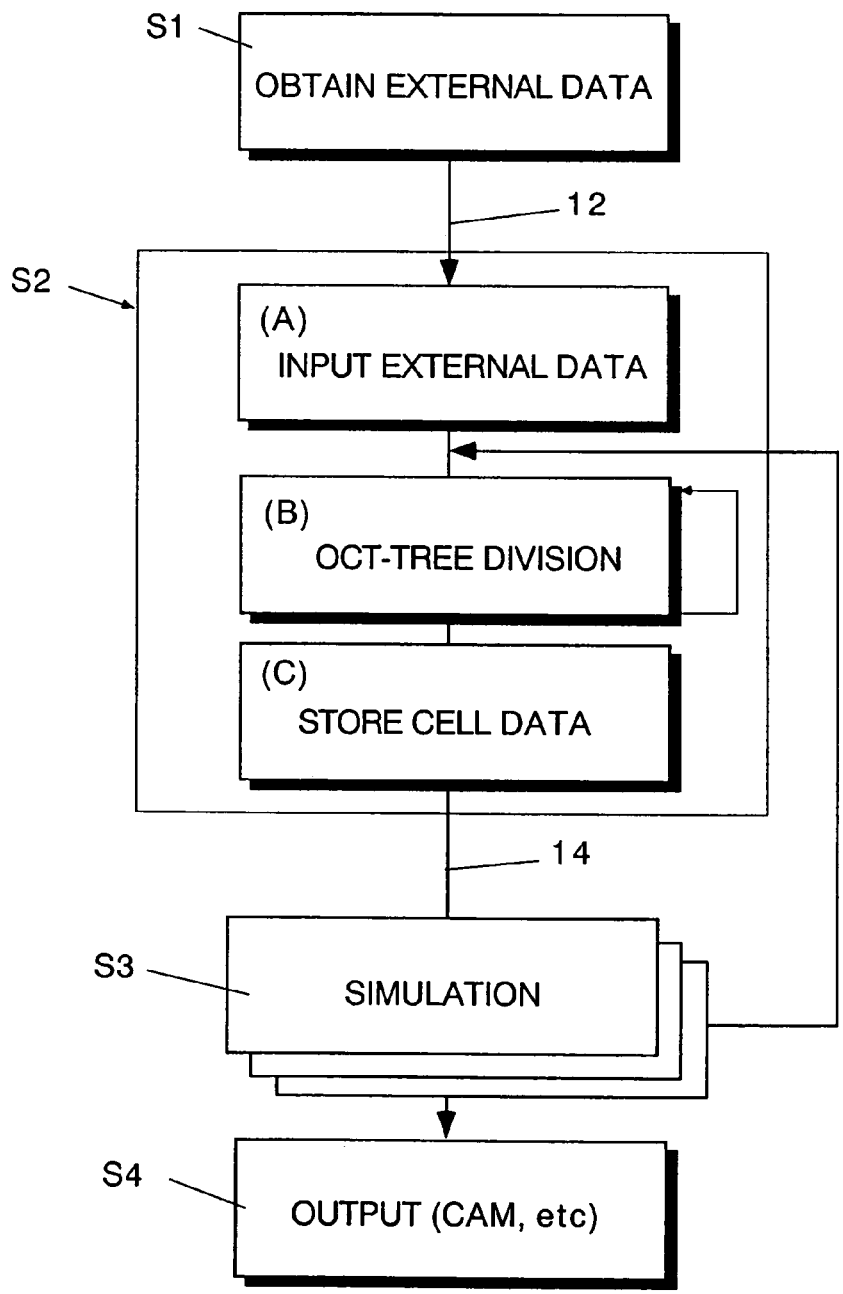
FIG. 1 is a flowchart showing a substantial data storing method of a prior application.
Figure 2:
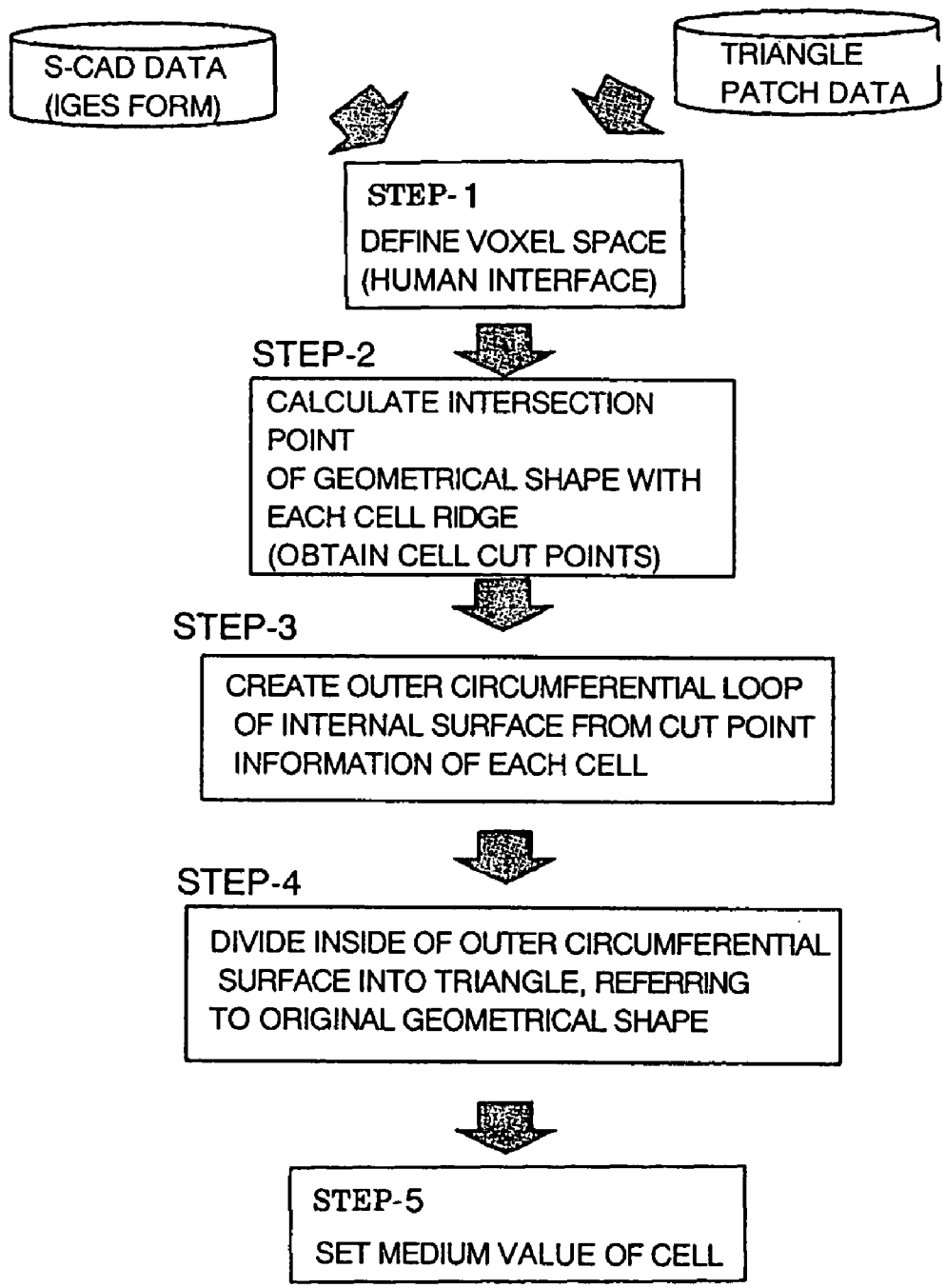
FIG. 2 is a flowchart showing another substantial data storing method of a prior application.
Figure 3:
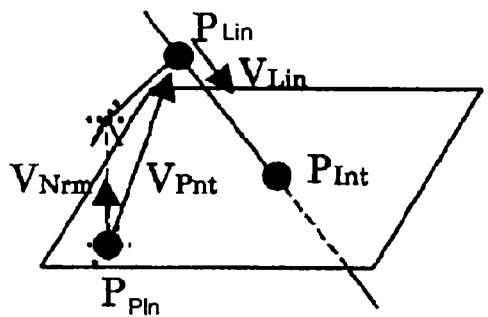
FIG. 3 is a schematic illustration showing a conventional method.
Figure 4:
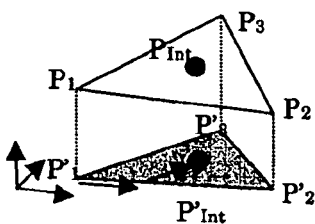
FIG. 4 is a schematic illustration showing another conventional method.
Figure 5A:
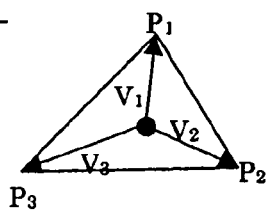
FIGS. 5A and 5B are schematic illustrations showing another conventional method.
Figure 5B:
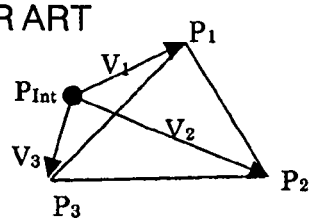
Figure 6A:
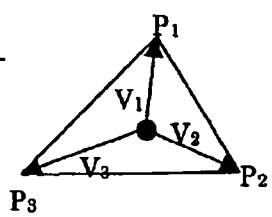
FIGS. 6A and 6B are schematic illustrations showing another conventional method.
Figure 6B:
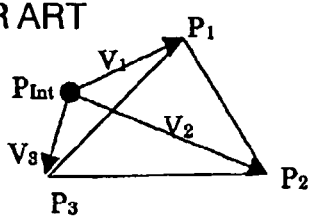
Figure 7:
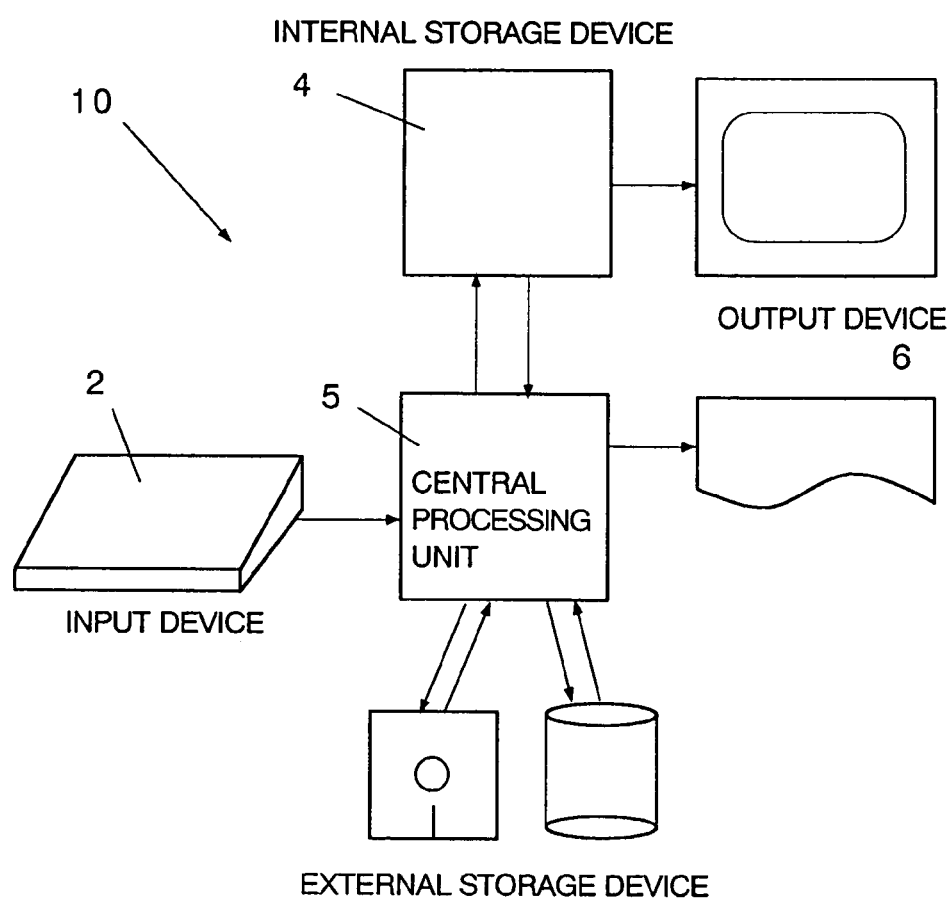
FIG. 7 shows a configuration of an apparatus that performs the method of the present invention.

FIG. 7 is a configuration of an apparatus for implementing the method of the present invention. As shown in FIG. 7, this apparatus 10 includes an input device 2, an external storage device 3, an internal storage device 4, a central processing unit 5 and an output device 6.

The input device 2 is a keyboard, for example, and inputs external data 12 including shape data of an object 1. The external storage device 3 is a hard disk, a floppy disk, a magnetic tape, a compact disk or the like, and stores substantial data of shape data and physical property data integrated with each other, and a storage operation program for the substantial data. The internal storage device 4 is a RAM or a ROM, for example, and stores the operational information. The central processing unit 5 (CPU) mainly processes the operation, input and output, and performs the storage operation program in cooperation with the internal storage device 4. The output device 6 includes a display and a printer, for example, and outputs the stored substantial data and the operational result of the storage operation program.

Figure 8:
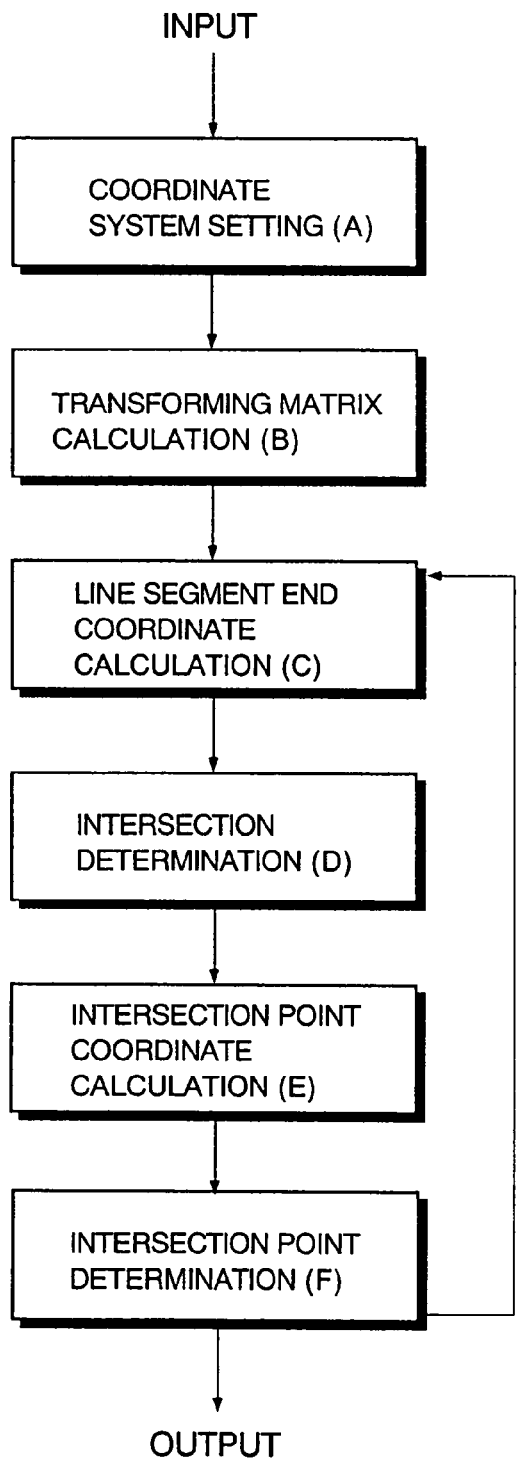
FIG. 8 is a flowchart showing the method and program of the present invention.

FIG. 8 is a flowchart of the intersection point calculation method and program of the present invention. As shown in FIG. 8, the intersection point calculation method and program include a coordinate system setting step (A), a transforming matrix calculation step (B), a line segment end coordinate calculation step (C), an intersection determination step (D), an intersection point coordinate calculation step (E), and an intersection point determination step (F).

The intersection point calculation method of the present invention is a method of calculating the intersection point of a triangle with a line segment, the triangle having vertexes $P_0$, $P_1$ and $P_2$, and the line segment having both ends A and B. The intersection point calculation program of the present invention causes a computer to calculate the intersection point of a triangle with a line segment, the triangle having vertexes $P_0$, $P_1$ and $P_2$, and the line segment having both ends A and B.

In the coordinate system setting step (A), a coordinate system R is set. In the coordinate system R, $P_0$ is a coordinate origin, $P_0P_1$ conforms to a first axis (U axis) to have a unit length, $P_0P_2$ conforms to a second axis (V axis) to have a unit length, and $P_0P_1 \times P_0P_2$ is a unit vector that conforms to a third axis (N axis).

In the transforming matrix calculation step (B), a transforming matrix M is calculated. The transforming matrix M transforms coordinate values in a normal coordinate system into coordinate values in the coordinate system R.

In the line segment end coordinate calculation step (C), u-, v- and n-coordinate values of the both ends A and B are calculated. In the intersection determination step (D), it is determined whether or not the line segment intersects the triangle, on the basis of u-, v- and n-coordinate values of the both ends A and B.

In the intersection point coordinate calculation step (E), u-, and v-coordinate values of the intersection point are calculated when the line segment intersects the triangle.

In the intersection point determination step (F), it is determined whether or not the intersection point is positioned inside the triangle, on the basis of u-, and v-coordinate values of the intersection point.

Next, the present invention will be described in detail.

1. In development of the volume CAD, the intersection point of the line segment with a triangle patch is repeatedly calculated. This triangle patch is often used for an input surface shape. In the calculation of the intersection point of the triangle with the line segment (cell ridge), an intersection point of a plane with a line is calculated, and it is then determined whether or not the intersection point is positioned inside an effective region on the line, and whether or not the intersection point is positioned inside an effective region on the plane (this determination is referred to as an inside/outside determination). Thus, a vector operation is performed many times, so that a calculation load becomes large. For example, for one kind of input triangle patch group, when the input triangle patch group is converted into volume data such as V-CAD (e.g., data expressing a three-dimensional entire extent, or data for CT, MRI or volume rendering), the division number and the resolution are changed, or the input data becomes lattice data having a hierarchical structure such as Oct-tree data or multiplex voxel data. In such a case, intersection points of one surface with edges of the lattice are calculated simultaneously or repeatedly one by one, resulting in a large amount of calculation. Accordingly, the conventional calculation method is not efficient, and a calculation method that substantially improves efficiency is desired. In the future, not only volume CAD but also other volume data are widely used because of data abundance, and for use of the volume data, a combination of a triangle patch and volume data is desired because of easy process and control. The present invention provides important technique for the combination of the triangle patch and the volume data.

According to the present invention, the input data is transformed by an affine transforming matrix which is generally used for displaying a shape on a computer. Thereby, the intersection point calculation and the inside/outside determination can be performed stably at a high speed. Particularly, in the case of repeatedly calculating the intersection point for the same triangle, the already created triangle-peculiar matrix is re-used to greatly reduce a calculation cost. For example, a mechanical component is often expressed by planes, so that a large triangle is used for input surface shape, and an intersection point of the same triangle with a cell ridge is calculated a number of times. In such a case, the present invention is outstandingly advantageous.

Figure 9:
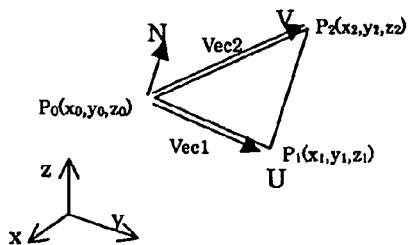
FIG. 9 is a schematic illustration showing a coordinate system R according to the present invention.

2. According to the present invention, as shown in FIG. 9, the two sides of the triangle are set to conform to first and second axes, respectively, and the normal of the triangle is set to conform to a third axis. The triangle vertex shared by the first and second axis is set to be the origin of the coordinate axes. In this manner, the space coordinate system R can be established.

To convert the orthonormal coordinate system into the above-described space coordinate system, an affine transforming matrix which is used for displaying an image on a computer, for example is calculated so as to relate the orthonormal coordinate system with the triangle.

The coordinates of the both ends of the line segment for which the intersection point is calculated are transformed into the coordinates in the space coordinate system R. Then, on the basis of the values of the transformed coordinates, it is determined whether or not the line segment exists, and whether or not the intersection point is positioned inside the triangle.

The use of the above method produces the following advantages:

(1) The intersection point calculation and the inside/outside determination can be performed by one step without increasing a storage capacity, enabling high speed calculation while the intersection point calculation and the inside/outside determination can be performed by two steps in the conventional method.

(2) When calculating the intersection points of plural line segments with the same triangle, a previously prepared geometric property is used, reducing a calculation cost.

(3) Since a simple algorism for the coordinate transformation and the inner product is used, the method can easily be embodied.

(4) The data obtained by the coordinate transformation includes the signed distance so that this signed distance can be used for calculating the distance from the original curved surface as the attribute data, and for confirming the front and back directions of the surface.

Figure 10:
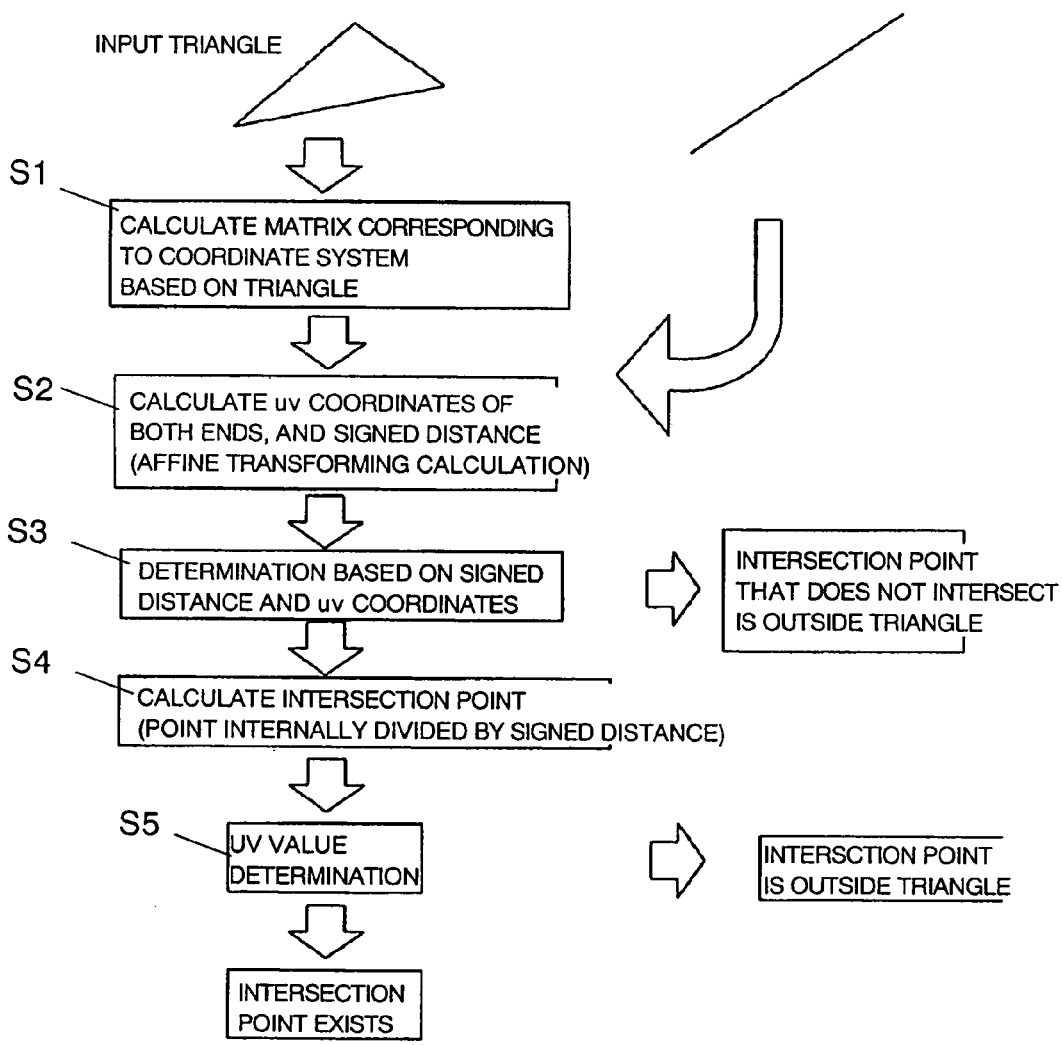
FIG. 10 is a flowchart concretely showing processes according to the present invention.

3. FIG. 10 is a flowchart concretely showing processes according to the present invention. As shown in FIG. 10, the three-dimensional coordinate data of the triangle having the vertexes $P_0$, $P_1$ and $P_2$ is input. Then, in the above-described coordinate system setting step (A), the coordinate system R is produced in which $P_0$ is the coordinate origin, the line segment P0P1 conforms to the first axis (U axis) to have a unit length, P0P2 conforms to the second axis (V axis) to have a unit length, and P0P1×P0P2 is a unit vector that conforms to the third axis (N axis)

Next, at the step S1, a matrix corresponding to the coordinate system R is calculated on the basis of the triangle. This step S1 corresponds to the above-described transforming matrix calculation step (B).

Subsequently, at the step S2, the u and v coordinates of the both ends A and B of the line segment, and the signed distance of the both ends are calculated by the affine matrix operation. This step S2 corresponds to the above-described line segment end coordinate calculation step (C).

Next, at the step S3, it is determined whether or not the line segment intersects with the triangle, on the basis of the signed distance and the u and v coordinates. This step S3 corresponds to the above-described intersection determination step (D). Next, at the step S4, the intersection point is calculated. This step S4 corresponds to the above-described intersection point coordinate calculation step (E).

Then, at the step S5, it is determined whether or not the intersection point is positioned inside the triangle, on the basis of the u and v coordinates of the intersection point. This step S5 corresponds to the above-described intersection point determination step (F).

4.1 The Calculating Procedure Will be Described in Detailed.

4.1.1 The Coordinate System Based on the Triangle, and the Matrix Corresponding to the Triangle.

As shown in FIG. 9, on the assumption that the vertexes of the triangle are the points $P_0$, $P_1$ and $P_2$, the coordinate system R is produced such that in the coordinate system R, $P_0$ is the coordinate origin, $P_0P_1$ conforms to the first axis (U axis) to have a unit length, $P_0P_2$ conforms to the second axis (V axis) to have a unit length, and $P_0P_1 \times P_0P_2$ is a unit vector that conforms to the third axis (N axis). Assuming that M is the matrix that transforms the ordinary orthonormal coordinates into the coordinates in the coordinate system R, the following equation (8):

$$P_{UVN} = MP_{xyz} \quad (8)$$

produces UV values on the coordinate surface, and the signed distance from the triangle that are calculated as u, v and n coordinates, which are determined from the triangle.

Thereby, it is possible to calculate or determine position relation between the triangle and an arbitrary point. For example, it is possible to calculate the signed distance between the triangle and the arbitrary point, or determine whether or not the point can be orthogonally projected on the triangle. Furthermore, when the intersection point is calculated a number of times for the same triangle, the matrix can be used without modification, so that calculation load can be reduced. As a result, the intersection point can be calculated at the higher speed.

Since this matrix includes functions of scaling, rotation, coordinate axis change, and parallel movement, transforming matrix of 4×4 is used. This transforming matrix is usually used for displaying computer graphics, and is generally referred to as an affine transformation.

If respective axis direction scalings are expressed by xScale, yScale and zScale, and the parallel movement is expressed by (xMove, yMove, zMove), the scaling matrix and the parallel movement matrix can be respectively expressed by the equations (9) and (10) of Formula 5.

The unit vectors in the respective axis directions in the uvn coordinate system are Vec1, Vec2 and VecN, respectively. If the components of Vec1 are (vx1, vy1, vz1), the components of Vec2 (vx2, vy2, vz2), and the components of Vec3 (vxn, vyn, vzn), the rotation matrix and the coordinate change matrix can be expressed by the equation (11) of Formula 5.

The transforming matrix is formed as the equation (12) of Formula 5 by unifying the scaling matrix, the parallel movement matrix and the rotation and coordinate axis change matrix.

[Formula 5]

$$M_{scale} = \begin{bmatrix} xScale & 0 & 0 & 0 \\ 0 & yScale & 0 & 0 \\ 0 & 0 & zScale & 0 \\ 0 & 0 & 0 & 1 \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (9)$$

$$M_{move} = \begin{bmatrix} 1 & 0 & 0 & xMove \\ 0 & 1 & 0 & yMove \\ 0 & 0 & 1 & zMove \\ 0 & 0 & 0 & 1 \end{bmatrix} = \begin{bmatrix} 1 & 0 & 0 & -x_0 \\ 0 & 1 & 0 & -y_0 \\ 0 & 0 & 1 & -z_0 \\ 0 & 0 & 0 & 1 \end{bmatrix} \quad (10)$$

$$M_{trans} = \begin{bmatrix} vx1 & vy1 & vz1 & 0 \\ vx2 & vy2 & vz2 & 0 \\ vxn & vyn & vzn & 0 \\ 0 & 0 & 0 & 1 \end{bmatrix}^{-1} \quad (11)$$

$$M = M_{move} \cdot M_{scale} \cdot M_{trans} \quad (12)$$

4.1.2 The Coordinate Transformation of the Both Ends of the Line Segment (Calculation of Signed Distance and uv Coordinates).

The affine transformation is performed on the start point and end point of the line segment by using the above-mentioned transforming matrix. In the affine transforming matrix of 4×4, each fourth column of the first to third lines is a movement amount, so that the multiplication target is always "1". In the matrix, the first to third columns of the fourth line is "0", the fourth column of the forth line is "1", and the multiplication target of the fourth column is always "1", so that the calculation of the fourth line always becomes "1". Accordingly, if instead of usual matrix calculation, the affine transformation calculation is performed, the calculation is performed for only the matrix components ranging from the firth line to third line and from first column to the third column, so that the necessary number of the calculation becomes only nine. As a result, the high speed calculation can be realized.

4.1.3 Determination of the Existence of the Intersection Point on the Basis of Coordinates of Two Transformed Points.

If one of the two transformed points has an absolute n-coordinate value larger than the length of the line segment, the intersection point does not exist.

If the n coordinates of the two transformed points have the same sign, the intersection point does not exist, and if the n coordinates of the two transformed points have different signs, the intersection point exists.

4.1.4 Determination of Whether the Possible Intersection Point is Inside the Triangle, on the Basis of u and v Coordinates of Two Transformed Points If both of the u-coordinate values of the two transformed points are equal to or smaller than "0", or equal to or larger than "1", the intersection point is outside the triangle.

If both of the v-coordinate values of the two transformed points are equal to or smaller than "0.0", the intersection point is outside the triangle.

If the sum of the u-coordinate value and v-coordinate value of each of the two transformed points becomes equal to or larger than "1.0", the intersection point is outside the triangle.

These requirements can exclude the line segment that does not apparently have the intersection point before actually calculating coordinate values of the intersection point.

4.1.5 u- and v-Coordinates are Calculated on the Assumption that the Intersection Point is the Point Internally Divided by the n-Coordinate Values of the Both Ends of the Line Segment.

4.1.6 It is Determined Whether or not the Intersection Point is Positioned Inside the Triangle, by Using the Following Requirement for the u and v Coordinates.

The intersection point is inside the triangle if the following requirement of the bottom one of inequalities (13) of Formula 6 is satisfied.

[Formula 6]

$$0 \leq u \leq 1 \text{(range in a } V_{ec1} \text{ direction)}$$

$$0 \leq v \leq 1 \text{(range in a } V_{ec2} \text{ direction)} \quad (13)$$

$$0 \leq u+v \leq 1 \text{(inside a line } P_1P_2 \text{)}$$

4.2 Calculation Cost and Calculation Result

The calculation of the present invention is compared to that of the Moller's method.

In the Moller's method, each vector product in the equation (14) of Formula 7 is used two times in the equation (15) of Formula 7. Accordingly, these vector products are previously calculated to be vectors P and Q, respectively. The division calculation in the equation (15) is previously performed to obtain the reciprocal.

In this case, the number of the multiplication calculations for obtaining the vector P becomes 6, and the number of the multiplication calculations for obtaining the vector Q becomes 6. Accordingly, the calculations for obtaining the value of "t" includes the multiplication for obtaining the vectors P and Q, and the inner product of the vector P and another vector, and the inner product of the vector Q and another vector, reciprocal calculation, and multiplication with the reciprocal. That is, to obtain the value of "t", the multiplication is performed 19 times, and division calculation is performed once.

To obtain a value "u", the additional 4 multiplications are required, and to obtain a value "v", the additional 4 multiplications are required.

On the other hand, according to the present invention, to obtain a signed distance and values of the both end points "u" and "v", 18 multiplications are required. If the signed distance has the same sign at the both end points, the value "t" is smaller than "0" or larger than "1", and the intersection point does not exists in the effective range of the line segment. Accordingly, for the value "t", the present invention can save one multiplication and one division calculation.

According to the present invention, to obtain the values "u" and "v", the calculation of the equation (16) of Formula 7 is required, so that to obtain the value "u", one division calculation and two multiplications are required, and to obtain the value "v", additional two multiplications are required. It should be noted that without obtaining the values "U" and "V" of each of the start point and the end point, it is possible to determine that the line segment does not intersects with the triangle if the each of the values "U" and "V" of The start point or the end point is smaller than "0", or the sum of the values "U" and "V" is equal to or larger than "1".

[Formula 7]

$$(\overrightarrow{P_1P_{Lin}} \times \overrightarrow{P_1P_2}) \subset (V_{Dir} \times \overrightarrow{P_1P_3}) \quad (14)$$

$$\begin{bmatrix} t \\ u \\ v \end{bmatrix} = \begin{bmatrix} (\overrightarrow{P_1P_{Lin}} \times \overrightarrow{P_1P_2}) \cdot \overrightarrow{P_1P_3} \\ (V_{Dir} \times \overrightarrow{P_1P_3}) \cdot \overrightarrow{P_1P_{Lin}} \\ (\overrightarrow{P_1P_{Lin}} \times \overrightarrow{P_1P_2}) \cdot \overrightarrow{P_1P_{Lin}} \end{bmatrix} / ((V_{Dir} \times \overrightarrow{P_1P_3}) \cdot \overrightarrow{P_1P_2}) \quad (15)$$

$$t = fabs(N_{P1}/(N_{P2} - N_{P1})) \quad (16)$$
$$U_{Int} = U_{P0} \times t - U_{P1} \times (1-t)$$
$$V_{Int} = V_{P0} \times t + V_{P1} \times (1-t)$$

Accordingly, the intersection calculation is performed in the following procedure:

at Step 1, the existence of the intersection point is determined in the effective range of the line segment (tVALUE);

at Step 2, by the value "u", it is determined whether or not the intersection point is effective; and at Step 3, by the value "v", it is determined whether or not the intersection point is effective.

In the case of this procedure, to determine the existence of the intersection point inside the triangle, calculation cost shown in Table 1 is required. Thus, the present invention can achieve the higher calculation efficiency.

TABLE 1

| STEP | Moller's Method | This Method |
| --- | --- | --- |
| Step1 tValue | 19Multi + 1Divide | 18Multi |
| Step2 uValue | 23Multi + 1Divide | 20Multi + 1Divide (18Multi) |
| Step3 vValue | 27Multi + 1Divide | 22Multi + 1Divide (18Multi) |

4.3 EMBODIED EXAMPLE 4.3.1 Embodied Example 1

Figure 11:
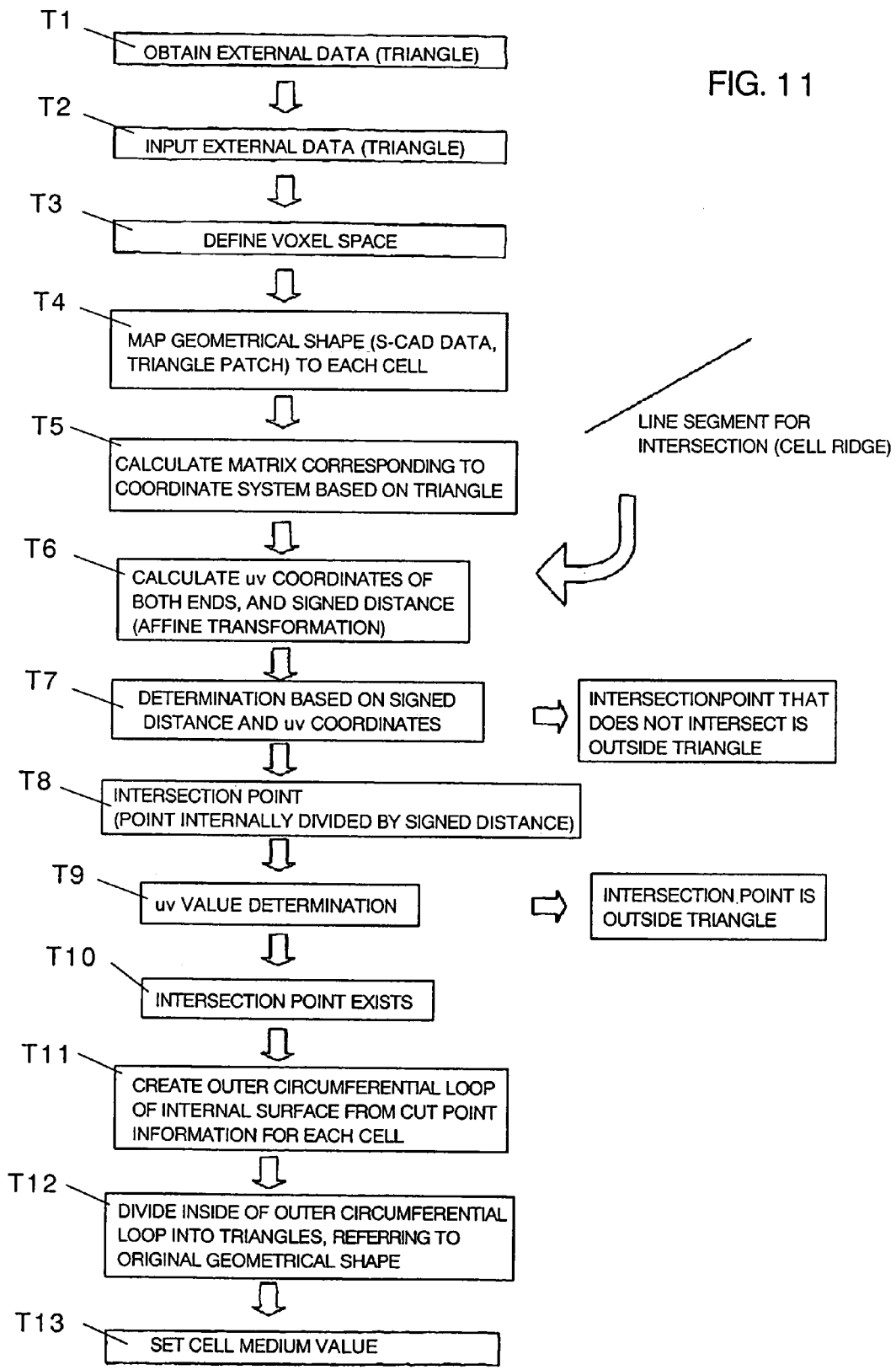
FIG. 11 is a flowchart showing a first embodied example according to the present invention.

FIG. 11 shows a procedure from the obtaining of the external data to the creating of the V-CAD data. In FIG. 11, before the above-described calculation of the intersection point, a process of mapping geometrical shape (S-CAD data or triangle patch) to each cell is performed. By this process, it is possible to reduce the target line segments (cell ridge) of the intersection, so that the time required for calculation can be reduced, and high speed calculation can be realized. If the mapping process is not performed, it becomes necessary to search for all line segments, so that the calculation time increases. For this reason, as in this embodied example, it is preferable to perform the mapping process before calculating the intersection point.

Figure 12:
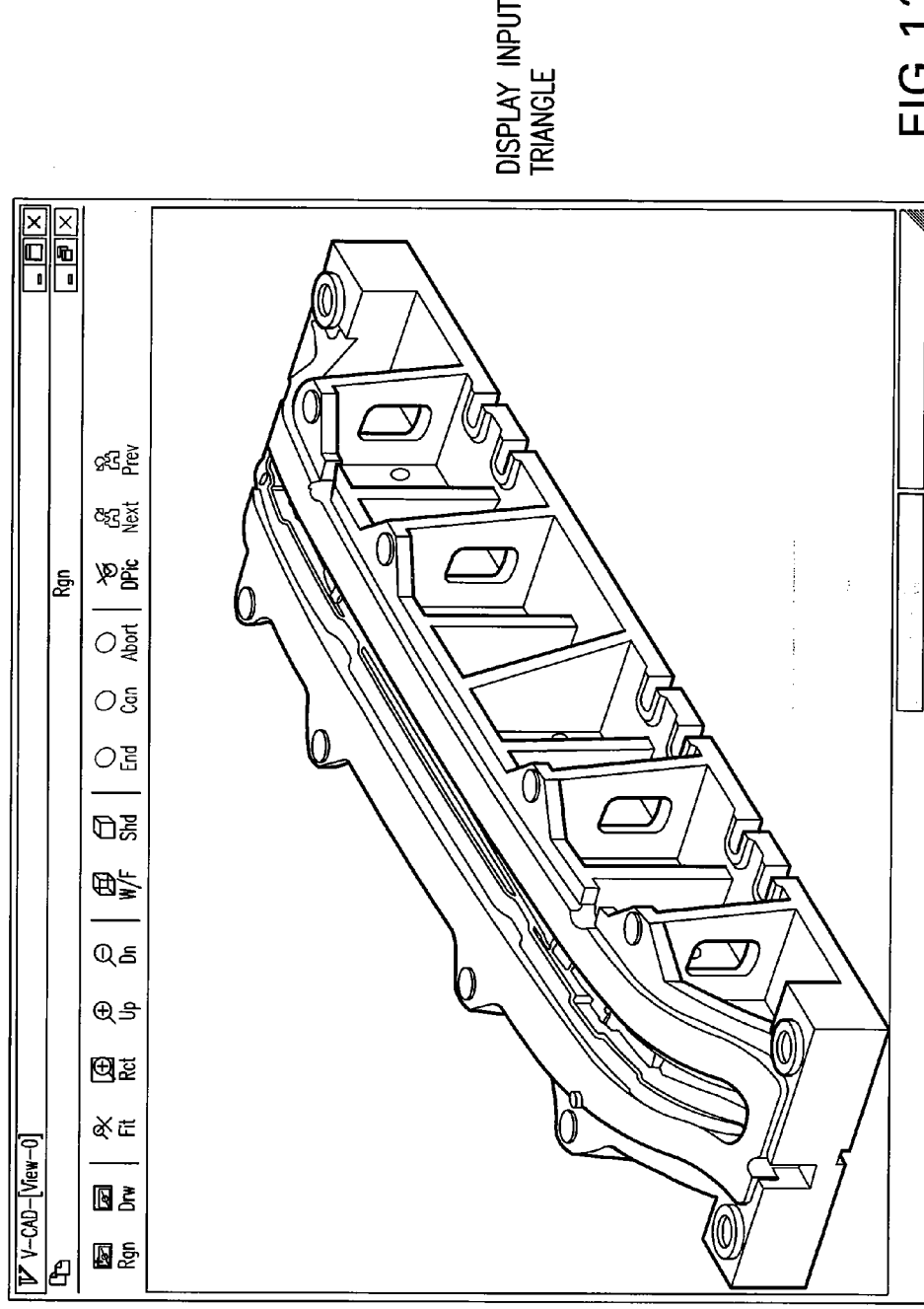
FIG. 12 is an image of input triangles.
Figure 13:
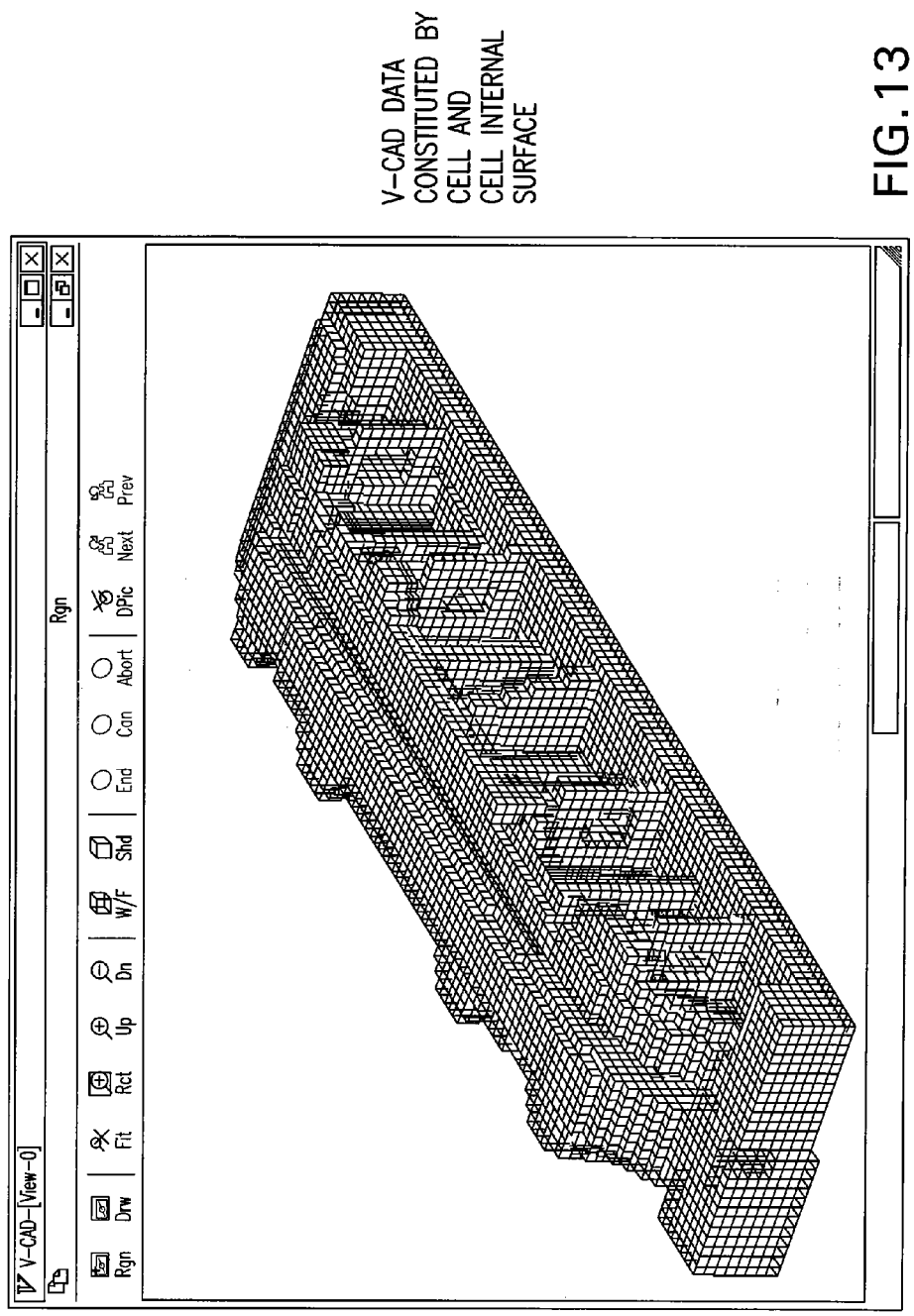
FIG. 13 is an image showing V-CAD data constituted by a cell and the internal surface of the cell.
Figure 14:
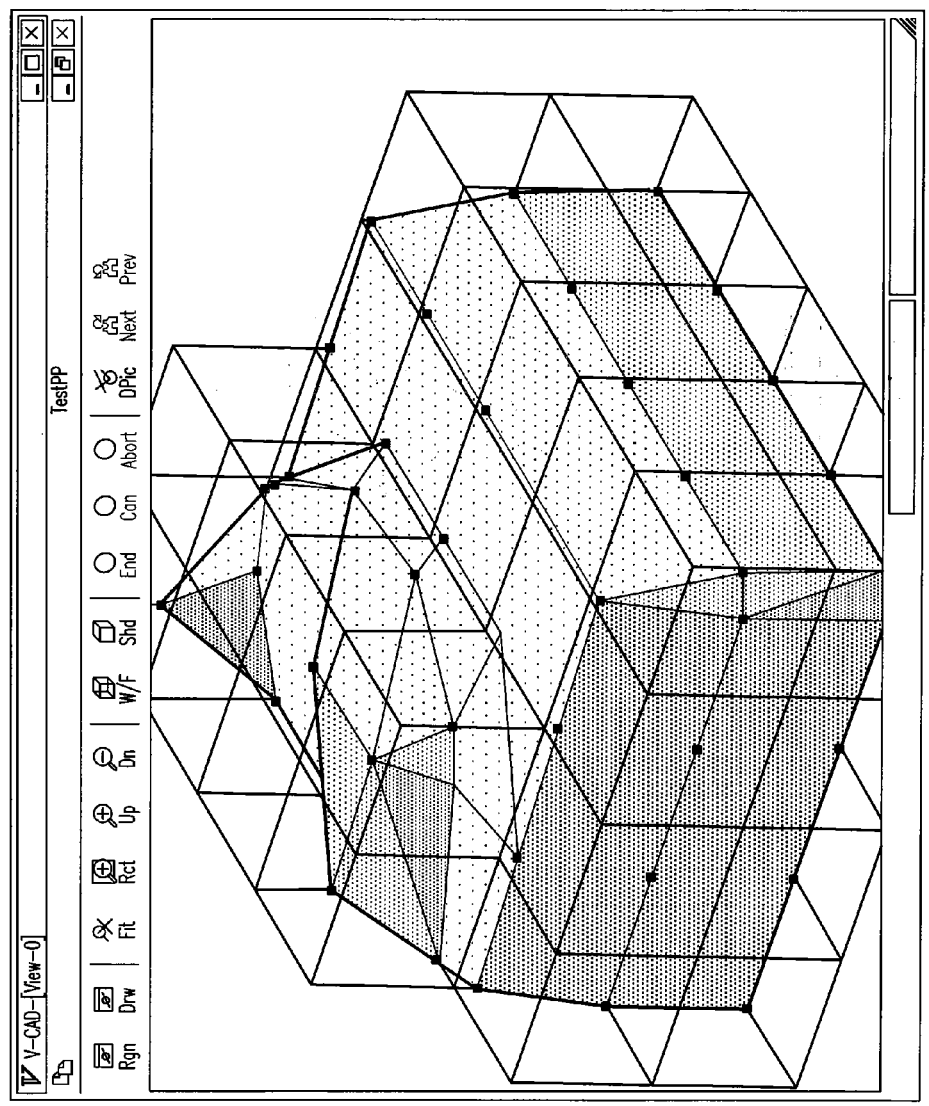
FIG. 14 is an image showing cell cut points produced by calculating an intersection point between input data and cell ridge.

FIGS. 12 through 14 are displayed images when the processes of FIG. 11 are performed. Specifically, FIG. 12 is the displayed image of the triangles that are input at STEP T2, and FIG. 13 is the displayed image of the V-CAD data created at STEP T13. FIG. 14 is an enlarged image of the displayed image of FIG. 13, and shows the cut points determined by calculating the intersection point between the input data and the cell ridge.

The calculation method of the present invention enabled the calculation speed to be raised by about 30 percent when the benchmark was performed.

4.3.2 Embodied Example 2

Figure 15:
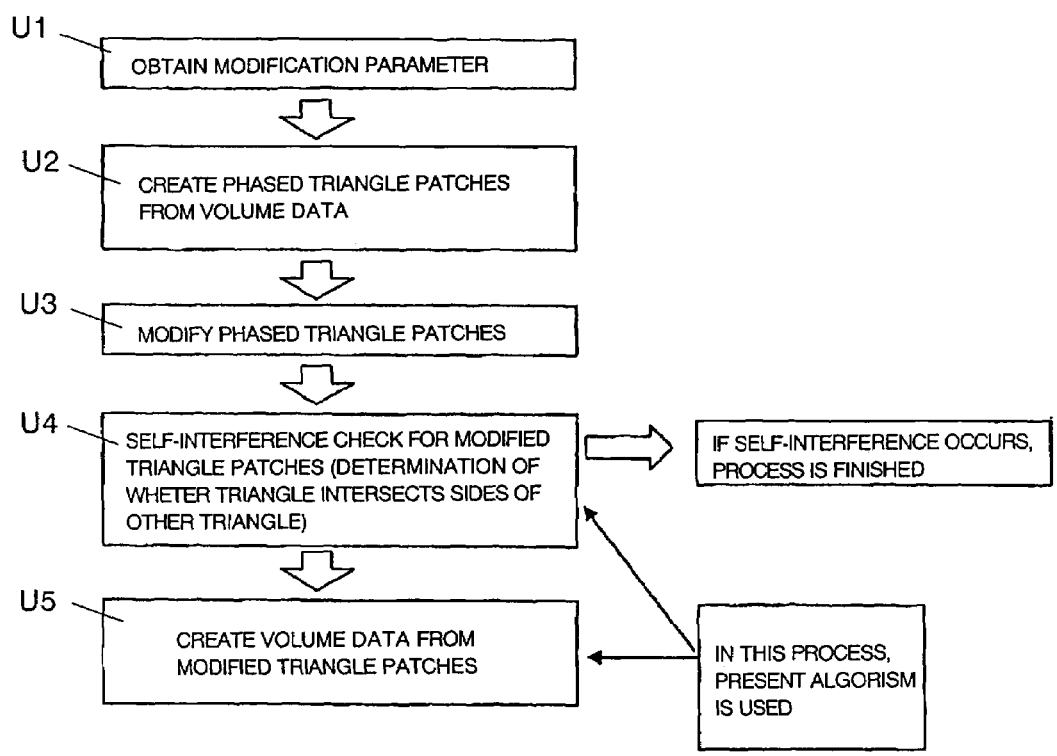
FIG. 15 is a flowchart showing a second embodied example according to the present invention.
Figure 16:
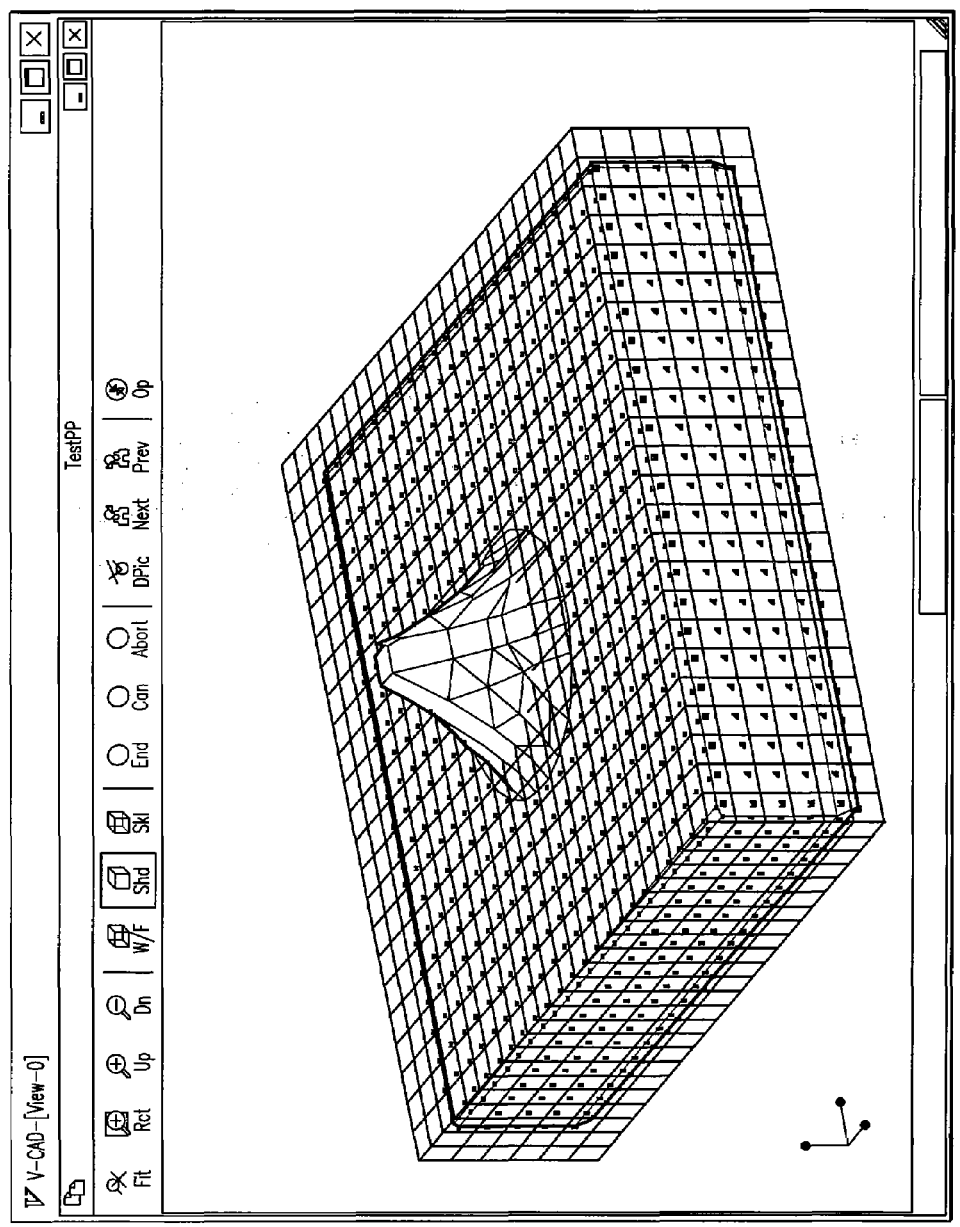
FIG. 16 is an image showing V-CAD data after shape modification process.

FIG. 15 shows a procedure when the method of the present invention is applied to an interference check when the shape modification process is performed. At STEP U4, the self-interfering check is performed by the intersection point calculation (the processes of STEP T5 through T11 of FIG. 11) before a series of the processes of FIG. 11 are performed. Thereafter, a series of processes of FIG. 11 are performed at STEP U5 so that the modified shape can be displayed. FIG. 16 is the displayed image of this modified shape.

4.3.3

As described above, when the intersection points of plural different line segments with the same triangle are calculated, the line segment calculation method and program exhibits an excellent advantage in that the calculation time can be reduced to achieve high speed calculation.

In the above, the several preferred embodiments of the present invention are described. However, the scope of the present invention is not limited to these embodiments, and the scope of the attached claims includes all improvements and equivalents of the present invention described in claim.

What is claimed is:

1. A method for calculating an intersection point of a triangle with a line segment, the triangle having three vertexes $P_0$, $P_1$, $P_2$, and the line segment having both ends A and B, comprising:
    a coordinate system setting step (A) of setting a coordinate system R in which $P_0$ is a coordinate origin, $P_0P_1$ conforms to a first axis (U axis) to have a unit length, $P_0P_2$ conforms to a second axis (V axis) to have a unit length, and $P_0P_1 \times P_0P_2$ is a unit vector conforming to a third axis (N axis),
    a transforming matrix calculation step (B) of calculating a transforming matrix M that transforms coordinate values in an ordinary coordinate system into coordinate values in the coordinate system R;
    a line segment end coordinate calculation step (C) of calculating u-, v- and n-coordinate values of the both ends A and B of the line segment;
    an intersection determination step (D) of determining whether or not the line segment intersects with the triangle, on the basis of the u-, v- and n-coordinate values of the both ends A and B;
    an intersection point coordinate calculation step (E) of calculating u-, and v-coordinate values of the intersection point when the line segment intersects with the triangle;
    an intersection point determination step (F) of determining whether or not the intersection point is positioned inside the triangle, on the basis of the u-, and v-coordinate values of the intersection point; and
    an output step of transmitting to an output device data to reflect (1) whether the intersection point is inside the triangle or outside the triangle, and/or (2) the coordinate values of the intersection point.

2. The method for calculating an intersection point of a triangle with a line segment according to claim 1, wherein the transforming matrix M calculated in the transforming matrix calculation step (B) is an affine transforming matrix.

3. The method for calculating an intersection point of a triangle with a line segment according to claim 1, wherein in the line segment end coordinate calculation step (C), the u-, v- and n-coordinate values are calculated by the equation (8):

$$P_{UVN} = MP_{xyz} \qquad (8).$$

4. The method for calculating an intersection point of a triangle with a line segment according to claim 1, wherein the intersection determination step (D) including:
    (1) determining that the intersection point does not exist when one of the both ends has the absolute n-coordinate value not smaller than a length of the line segment, and
    (2) determining that the intersection point exists when the n-coordinate values of the both ends have different signs.

5. The method for calculating an intersection point of a triangle with a line segment according to claim 1, wherein the intersection determining step (D) includes determining that the intersection point is positioned outside the triangle (1) when each of the both ends has the u-coordinate value not larger than "0" or not smaller than "1", (2) when each of the both ends has v-coordinate value not larger than "o", or (3) when each of the both ends has the u- and v-coordinate values of which sum is not smaller than "1".

6. The method for calculating an intersection point of a triangle with a line segment according to claim 1, wherein the intersection point coordinate calculating step (E) includes:
    internally dividing the line segment by the n-coordinate values of the both ends A and B to determine the internally divided point as the intersection point; and
    calculating u- and v-coordinate values of the intersection point.

7. The method for calculating an intersection point of a triangle with a line segment according to claim 1, wherein the intersection point determination step (F) includes determining that the intersection point is positioned inside the triangle when the u- and v-coordinate values of the intersection point satisfy three inequalities (13) of Formula 1:

$$0 \leq u \leq 1 (\text{range in a } V_{ec1} \text{ direction})$$

$$0 \leq v \leq 1 (\text{range in a } V_{ec2} \text{ direction}) \qquad (13)$$

$$0 \leq u+v \leq 1 (\text{inside a line } P_1P_2).$$

8. A program, stored on a computer-readable medium, causing a computer to calculate an intersection point of a triangle with a line segment, the triangle having three vertexes $P_0$, $P_1$, $P_2$, and the line segment having both ends A and B, the program causing a computer to perform:
    a coordinate system setting step (A) of setting a coordinate system R in which $P_0$ is a coordinate origin, $P_0P_1$ conforms to a first axis (U axis) to have a unit length, $P_0P_2$ conforms to a second axis (V axis) to have a unit length, and $P_0P_1 \times P_0P_2$ is a unit vector conforming to a third axis (N axis),
    a transforming matrix calculation step (B) of calculating a transforming matrix M that transforms coordinate values in an ordinary coordinate system into coordinate values in the coordinate system R;

a line segment end coordinate calculation step (C) of calculating u-, v- and n-coordinate values of the both ends A and B of the line segment;

an intersection determination step (D) of determining whether or not the line segment intersects with the triangle, on the basis of the u-, v- and n-coordinate values of the both ends A and B;

an intersection point coordinate calculation step (E) of calculating u-, and v-coordinate values of the intersection point when the line segment intersects with the triangle;

an intersection point determination step (F) of determining whether or not the intersection point is positioned inside the triangle, on the basis of the u-, and v-coordinate values of the intersection point; and an output step of transmitting to an output device data to reflect (1) whether the intersection point is inside the triangle or outside the triangle, and/or (2) the coordinate values of the intersection point.

* * * * *